United States Patent
Singh et al.

(10) Patent No.: US 9,582,261 B2
(45) Date of Patent: Feb. 28, 2017

(54) METHODS AND APPARATUS TO UPDATE APPLICATION DEPLOYMENTS IN CLOUD COMPUTING ENVIRONMENTS

(71) Applicant: VMWARE, INC., Palo Alto, CA (US)

(72) Inventors: Servesh Singh, Bangalore (IN); Arun Narayanaswamy, Bangalore (IN); Kiran Singh, Bangalore (IN); Ashish Kumar Jain, Bangalore (IN); Agila Govindaraju, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 38 days.

(21) Appl. No.: 14/453,728

(22) Filed: Aug. 7, 2014

(65) Prior Publication Data

US 2015/0378716 A1 Dec. 31, 2015

(30) Foreign Application Priority Data

Jun. 26, 2014 (IN) .......................... 3122/CHE/2014

(51) Int. Cl.

| | | |
|---|---|---|
| G06F 9/44 | (2006.01) | |
| G06F 15/177 | (2006.01) | |
| G06F 9/445 | (2006.01) | |
| H04L 29/08 | (2006.01) | |
| G06F 3/0484 | (2013.01) | |
| G06F 3/0482 | (2013.01) | |
| H04W 4/00 | (2009.01) | |

(52) U.S. Cl.
CPC .............. *G06F 8/65* (2013.01); *G06F 3/0482* (2013.01); *G06F 3/04842* (2013.01); *G06F 3/04847* (2013.01); *H04L 67/10* (2013.01); *H04W 4/003* (2013.01)

(58) Field of Classification Search
CPC .......................................................... G06F 8/65
USPC .......................................................... 717/172
See application file for complete search history.

(56) References Cited

U.S. PATENT DOCUMENTS

| | | | | |
|---|---|---|---|---|
| 2002/0055351 | A1* | 5/2002 | Elsey | G06Q 10/109 455/414.2 |
| 2005/0114315 | A1* | 5/2005 | Tanner | H04L 41/22 |
| 2011/0107299 | A1* | 5/2011 | Dehaan | G06F 9/45533 717/121 |
| 2013/0326493 | A1* | 12/2013 | Poonamalli | G06F 8/65 717/168 |

(Continued)

*Primary Examiner* — James D Rutten

(57) ABSTRACT

Methods, apparatus and systems are disclosed to update application deployments in cloud computing environments. An example method disclosed herein includes identifying an update profile to promote across the plurality of deployment environments, the update profile to update a component of the application, in response to a notification of promotion of the update profile received at a first deployment environment. The example method also includes displaying a user-selectable control in a user interface, the user-selectable control to specify whether to apply the update profile to the component of the application deployed in the first deployment environment, based on selection of the user-selectable control, performing a compatibility check of the first deployment environment and the update profile, and based on an outcome of the compatibility check, applying the update profile to the component of the application deployed in the first deployment environment.

18 Claims, 12 Drawing Sheets

(56) References Cited

U.S. PATENT DOCUMENTS

2014/0007070 A1* 1/2014 Huang .................. G06F 8/65
717/170
2014/0164386 A1* 6/2014 Baldwin ................ G06F 8/61
707/740

* cited by examiner

METHODS AND APPARATUS TO UPDATE APPLICATION DEPLOYMENTS IN CLOUD COMPUTING ENVIRONMENTS

RELATED APPLICATION

Benefit is claimed under 35 U.S.C. 119(a)-(d) to Foreign application Serial No. 3122/CHE/2014 filed in India entitled "METHODS AND APPARATUS TO UPDATE APPLICATION DEPLOYMENTS IN CLOUD COMPUTING ENVIRONMENTS", filed on Jun. 26, 2014, by VMware. Inc., which is herein incorporated in its entirety by reference for all purposes.

FIELD OF THE DISCLOSURE

This disclosure relates generally to virtualized computing environments, and, more particularly, to methods and apparatus to update application deployments in cloud computing environments.

BACKGROUND

"Infrastructure-as-a-service" (sometimes referred to as "IaaS") generally describes a suite of technologies provided by a service provider as an integrated solution to allow for elastic creation of a fully virtualized, network, and pooled computing platform (sometimes referred to as a "cloud computing platform"). Enterprises may use IaaS as a business-internal organizational cloud computing platform (sometimes referred to as a "private cloud" or a "private cloud computing platform") that gives an application developer access to infrastructure resources, such as virtualized servers, storage, and networking resources. By providing ready access to the hardware resources required to run an application, the cloud computing platform enables application developers to build, deploy, and manage the lifecycle of a virtual application (e.g., a web application, a networked application, etc.) at a greater scale and at a faster pace than before. To deploy an application, a developer, who understands the architecture of the application, must coordinate with a system administrator, who controls access to computing resources, to determine which computing resources (e.g., computing, networking, and/or storage) and/or software services (e.g., software packages) should be provisioned to support execution of the application.

DETAILED DESCRIPTION

Figure 1:
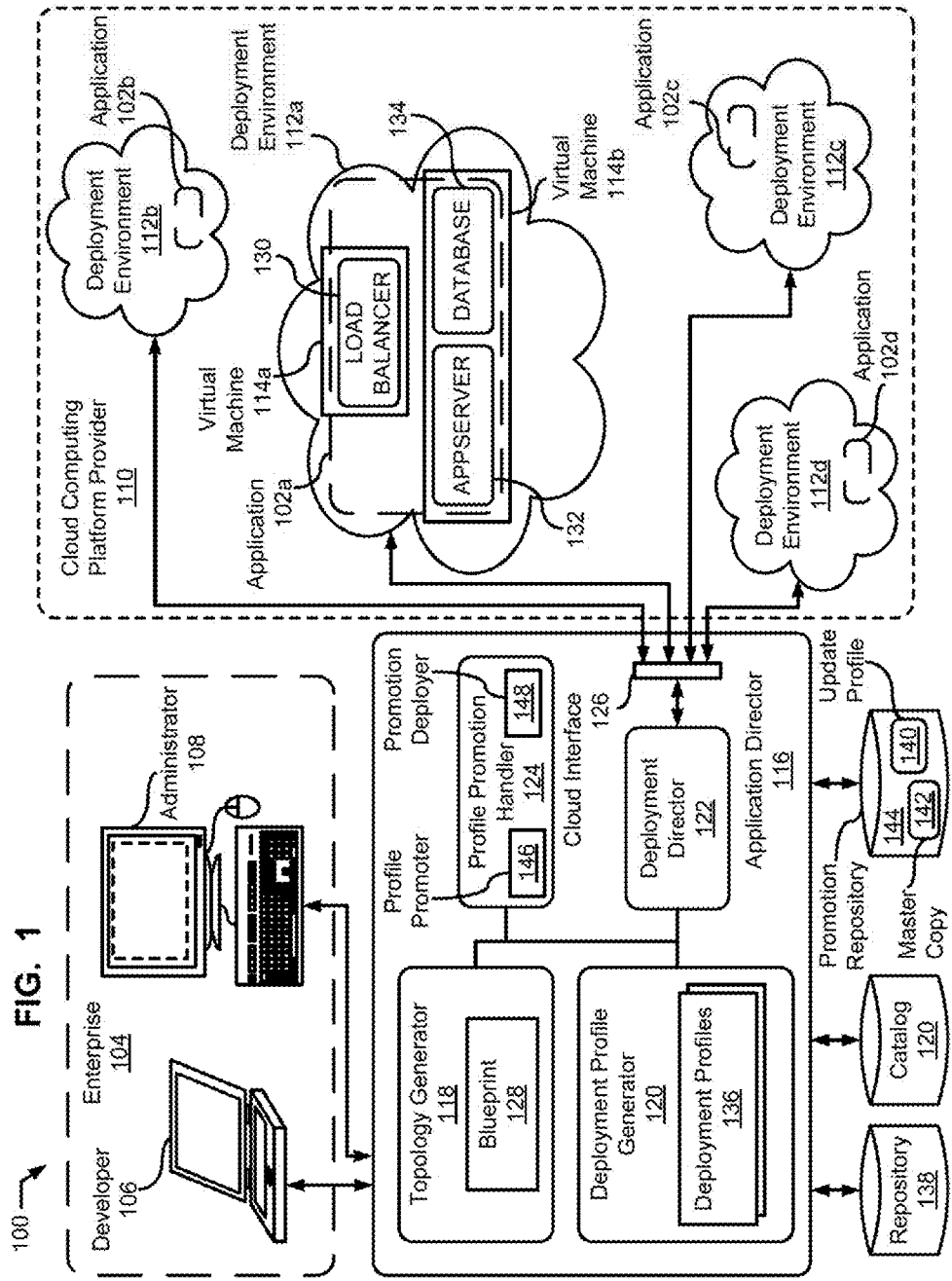
FIG. 1 is a block diagram of an example cloud computing environment constructed in accordance with the teachings of this disclosure to update application deployments in cloud computing environments.

Numerous tools exist to create and deploy applications in cloud computing environments. For example, application provisioning tools enable cloud computing designers to create and standardize application deployment topologies on infrastructure clouds. Some application provisioning tools include graphical user interfaces (GUIs) that enable designers to generate application deployment topologies called application blueprints. These application blueprints define the structure of an application, enable the user of standardized application infrastructure components, and/or include installation dependencies and/or default configurations for custom and packaged enterprise applications. Application blueprints specify logical deployment topologies that are portable across private IaaS clouds (e.g., an enterprise cloud based on VMware vSphere® Platform or any other suitable private cloud network) and across public clouds (e.g., Amazon Web Services ("AWS") or any other suitable public cloud network). Cloud providers offer a cloud instance for deployment. The deployment environment provides an environment for the cloud provider.

Application designers (e.g., developers) can use the GUI provided by the application provisioning tools to create visual application blueprints. These blueprints standardize the structure of the application, including software components, dependencies, and configurations, for repeated deployments. After a blueprint is available, application designer teams (e.g., development teams, quality assurance teams, release teams, etc.) can repeatedly deploy a standard blueprint, customize configurations as allowed, and deploy within deployment environments (e.g., enterprise approved deployment environments).

Many applications are developed with a multi-tier architecture in which functions such as presentation, application processing, and data management are logically separate components. For example, an enterprise's custom banking application that has a multi-tier architecture may use a cluster of application server nodes (e.g., JBoss Application Servers) to execute in a scalable runtime environment, a database node (e.g., a relational database management system such as MySQL) to store account data, and a load balancer node to distribute network traffic for robustness. Deploying a multi-tiered application in a cloud computing environment may involve a cloud computing platform provider (e.g., VMware®) providing a deployment environment to provision virtual computing resources (e.g., virtual machines (VMs)) in which an enterprise (e.g., an organization, an agency, a corporation, etc.) can deploy its application. When the application is deployed, a large number of deployments of an application may be deployed. Further, if the components/nodes of an application are deployed across multiple deployment environments, making sure the components/nodes are up-to-date, for example, from security vulnerabilities, is a complex and daunting task for an enterprise. Further still, the multiple deployment environments may have different deployers (e.g., administrators) who are responsible for the resources in the deployment environment managed by the administrator. As such, some deployers may elect to update a component/node while other deployers may not update the component/node, resulting in different versions of the same application deployed across multiple deployment environments. Updating (or patching) an application can be a complex, risky, and time-consuming and may include periods of system downtime.

From an application blueprint, different application deployments can be created using deployment profiles to, for example, test prototypes or deploy critical multi-tier applications in production environments. From these saved blueprints, application deployers can generate execution plans for deploying the application to private and/or public clouds. In addition, an update process to scale clustered nodes of deployed applications and/or change the configuration or code of deployed applications when a new version is available may be initiated. Deployment settings (e.g., virtual computing resources' cluster size, CPU, memory, networks, etc.) and an execution plan of tasks having specified computing resources are provisioned and application components are installed, configured and started. The deployment profile provides an administrator with a process-oriented view of the application blueprint that indicates discrete steps to be performed to deploy the application. The deployment settings can be encapsulated in the deployment profiles, separate from the application blueprints. Different deployment profiles may be generated from a single blueprint to test prototypes (e.g., new application versions), to scale-out and/or scale-in deployments, and/or to deploy the application to different deployment environments (e.g., testing, staging, production). In addition, a deployment profile may be distributed as a local deployment plan having a series of tasks to be executed by virtual machines provisioned from a cloud computing environment.

For example, for a load balancer, if an administrator is deploying an application to a test environment, the administrator may select an internal network for two load balancer network NICs. In contrast, when the administrator creates a deployment profile for the production environment, the administrator may select an internal network for one load balancer NIC and an external network for the other load balancer NIC.

To protect their systems, enterprises may need to periodically update (or patch) an application or deployment. When a deployed application is updated, application provisioning tools may create an update profile that captures new values for the changes required for that update. Updates may also be rolled back to restore a previous update. Saved update profiles may be deployed multiple times to update existing deployments. An update profile may be created by scaling-in and/or scaling-out a cluster of a node or modifying the configurations of existing services and/or application components. Update profiles enable application designers to update the components/nodes of an application already deployed in the deployment environment. An update profile may be processed to update configuration properties of the components/nodes (e.g., modify the configurations and/or code of existing services in a deployed application e.g., a database node) or application components such as SQL, modify a port number, change passwords, certificates, scripts, change the tasks to be executed by the virtual machines, etc.). Update profiles may also be processed to scale-in a deployment (e.g., free resources from a virtual machine when workloads decrease at the computing node) or scale-out a deployment (e.g., allocating resources (e.g., virtual machines, networking resources, storage resources, etc.) for use by a virtual machine when workloads increase at the computing node).

To more efficiently update a deployed application, as disclosed herein, an update profile may be promoted to notify multiple (e.g., all) deployments of the same application in the available deployment environments that an update is available for deployment. A deployer may promote an existing update profile to update any deployment across multiple deployment environments. For example, a deployer can apply a security-related configuration update to one or more components of an application on different deployments originating from the same application version. For example, an application designer can create an update profile and apply the update to a deployment in a deployment environment (e.g., a development deployment environment). If the application designer wishes to update other deployments of the application scattered across multiple deployment environments, the application designer may promote the update profile to selected ones of available deployment environments.

In some instances, it may be beneficial to rollback an update process. For example, if an update process fails to modify a configuration, performance problems develop in the updated deployment, etc., the rollback process may be initiated to restore that update to the last successful state in its timeline. When rollback of an update process is initiated, the rollback process is performed on the services and/or components the update process attempted to modify, and also on any dependent nodes.

Examples disclosed herein also create a master copy of the update profile to copy and make available (e.g., distribute) to the selected ones of the deployment environments. In addition, examples disclosed herein maintain a log of promoted update profiles including, for example, which update profiles were updated (e.g., a source update profile), which deployment environments were selected, which copies of the update profiles were made available to the deployment environments, which deployment environments accepted the updates, etc.

An application may be scattered across multiple deployment environments in which multiple administrators control the resources in the deployment environments managed by the respective administrators. Rather than forcing an update onto each of the deployment environments, examples disclosed herein enable each administrator of the selected ones of the deployment environments to accept or reject the updates identified in the promoted updated profile. Examples disclosed herein create a local update profile based on the promoted update profile at a deployment environment when the respective administrator accepts the update. In this manner, the administrator is provided control of the resources in the deployment environment managed by the administrator. The administrator may also edit the local update profile based on the needs known to the administrator.

In some examples, an update for a first version of an application may not be compatible with a second version of the application. Accordingly, examples disclosed herein also perform a compatibility check when an update identified in a promoted update profile is accepted. Some examples may include a check of whether the promoted update is compatible with the target application by checking, for example, whether updated components/nodes are present and executing in the deployment environment, whether updated properties or configurations are present in the target application, whether the deployment environment includes cluster nodes, whether the target application is executing compatible components/nodes (e.g., a Microsoft Windows® update is not being applied to a Linux® executing node, etc. If an update is determined not to be compatible with the target application, the update process may be cancelled and/or discarded.

As used herein, a node is a virtual machine and/or a cluster of virtual machines (also referred to as a "cluster node"). A virtual machine is a software stack comprising one or more operating systems, applications and/or services. As used herein, an application (also referred to herein as a "virtual application" or an "appliance") is a logical deployment unit that defines the relationship between an operating system one or more application components and/or services dependent on the operating system. An application may also define the relationship between application components that can be distributed across multiple virtual machines. As used herein, an application component refers to services and/or code components. Code components are application-specific binaries, scripts, or processes, etc., usually written by a developer and packaged into one or more files, to provide logic (e.g., relationship definitions) for an application. In some examples, code components may be a type or format of scripting and application code. Example types of code components include Java Archive (JAR) files, Java Enterprise Archive (EAR) files, Java web application archive (WAR) files, Ruby Gem packages, SQL scripts, and other suitable modules of scripting logic.

Services, as used herein, are scripted software that provide a software infrastructure for an application. Services may be reused in multiple applications. Example services include application servers (e.g., Rails, Apache Tomcat, JBoss, etc.), database servers (e.g., GemFire, MySQL, SQL-Fire, MongoDB, Postgress, etc.), monitoring services (e.g., Hyperic, SpringInsight, etc.), web servers (e.g., Apache, VMWare vFabric Enterprise Ready Server, etc.), messaging services (e.g., RabbitMQ, etc.), middleware services, etc. As used herein, the term component generally refers to one or more of application components, code components, and/or services.

FIG. 1 is a block diagram of an example cloud computing environment 100. In the illustrated example of FIG. 1, an example application 102 created by an example developer 106 is deployed for an example enterprise 104 in an example deployment environment 112 provided by an example cloud computing platform provider 110 (also referred to as a "cloud provider"). In the illustrated example, the cloud computing platform provider 110 of FIG. 1 provides multiple deployment environments 112, for example, separate deployment environments may be used for development, testing, staging, and production of the application 102. For example, an example development version 102a of the application 102 is deployed in an example development deployment environment 112a, an example testing version 102b of the application 102 is deployed in an example testing deployment environment 112b, an example staging version 102c of the application 102 is deployed in an example staging deployment environment 112c, and an example production version 102d of the application 102 is deployed in an example production deployment environment 112d. The example enterprise 104 may access services from the example cloud computing platform provider 110, for example, via a client-server communication protocol such as representational state transfer (REST) application programming interfaces (APIs). In the illustrated example of FIG. 1, the cloud computing provider 110 provisions virtual computing resources (e.g., example virtual machines 114) to provide the respective deployment environments 112 in which the enterprise 104 can deploy the application 102 (e.g., a multi-tiered application).

In the illustrated example of FIG. 1, the developer 106 uses an example application director 116, which may be implemented by one or more virtual machines 114, to orchestrate deployment of the application 102 into the deployment environments 112. In the illustrated example of FIG. 1, the application director 116 includes an example topology generator 118, an example deployment profile generator 120, an example deployment director 122, an example profile promotion handler 124, and an example cloud interface 126.

In the illustrated example of FIG. 1, the example topology generator 118 generates an example application blueprint 128 specifying a logical topology of the application 102, which is to be deployed. The example blueprint 128 maps the structure of the application 102 as a collection of components/nodes (e.g., an example load balancer node 130, an example application server (appserver) node 132, and an example database node 134). Applications, such as the application 102 of FIG. 1, are typically developed with a multi-tier architecture in which functions such as presentation, application processing, and data management are logically separate components. For example, the topology generator 118 may generate a blueprint 128 (e.g., a topology map) for an online store application specifying a web application executing on an application server (e.g., an Apache Tomcat application server) that uses a data store as a database (e.g., a MongoDB). The example web application may be implemented by a Java web application archive (e.g., a "WAR" file) comprising dynamic web pages, static web pages, Java servlets, Java classes, and/or other properties, configuration information and/or resource files included in the Java web application. In the illustrated example, the blueprint 128 is an abstract representation of the structure of the application 102 including virtual machines and their corresponding application components, operating systems, dependencies and/or configurations. In some examples, the blueprint 128 standardizes the structure of an application for repeated deployments in multiple and/or diverse deployment environments. The application 102 may alternatively describe, for example, an entire online store application, including application server components and database components, rather than just the web application itself.

In the illustrated example of FIG. 1, the topology generator 118 retrieves virtual computing resources from an example catalog 120 to assemble the blueprint 128. For example, the catalog 120 may list virtual computing resources (e.g., virtual machines, networking resources, storage resources, etc.) that may be provisioned from the cloud computing platform provider 110 and corresponding application components (e.g., software services, scripts, code components, application-specific packages, etc.) that may be installed on the provisioned virtual computing resources. The example catalog 120 of the illustrated example is pre-populated with available virtual computing resources and/or application components. In some examples, an administrator 108 (e.g., an information technology (IT) administrator, a system administrator, etc.) customizes the catalog 120 by adding and/or modifying the available virtual computing resources and/or application components listed in the catalog 120. For example, the administrator 108 may enter specifications, configurations, properties, custom tasks, etc. about each entry in the catalog 120. The example blueprint 128 of the illustrated example includes an installation order for the application components during deployment. For example, the blueprint 128 may define dependencies between one or more of the application components that controls the installation order. For example, the developer 104 may specify a dependency from an Apache service (e.g., the example load balancer node 130) to an application code package such as a web application (e.g., the example appserver node 132). In some such examples, the dependency may be that the load balancer may not be configured until installation of the web application is complete.

In the illustrated example of FIG. 1, the deployment profile generator 120 generates an example deployment profile 136 based on the blueprint 128. The example deployment profile 136 includes deployment settings (e.g., state information such as virtual computing resource cluster sizes, processing resources, memory, networking resources, etc.) and an execution plan identifying tasks having an order in which virtual computing resources are provisioned and application components are installed, configured, and started. The deployment profile 136 of the illustrated example is a process-oriented view of the blueprint 128. For example, the administrator 108 may follow discrete steps included in the deployment profile 136 to deploy the application 102. In some examples, different deployment profiles 136 may be generated from a single blueprint 128 to test prototypes (e.g., new application versions), to update application versions, to scale (e.g., scale-out or scale-in) deployments, and/or to deploy the application 102 to different deployment environments (e.g., the development version 102a deployed in the development deployment environment 112a, the testing version 102b deployed in the testing deployment environment 112b, the staging version 102c deployed in the staging environment 112c, the production version 102d deployed in the production deployment environment 112d, etc.). In the illustrated example, the deployment profile generator 120 stores deployment profiles such as the example deployment profile 136 in an example profile repository 138. The example deployment profile generator 120 of FIG. 1 stores the deployment profiles for subsequent use (e.g., at a deployment-time) to deploy, for example, the application 102.

In the illustrated example, the deployment profile generator 120 generates the deployment profile 136 in response to user input (e.g., from the developer 106) to initiate a deployment process for the application 102 in a specified deployment environment 112. In some examples, the deployment profile generator 120 allows the administrator 108 to insert one or more custom tasks in the deployment profile 136. For example, custom tasks may be scripts that, when executed by a virtual machine, perform operations that facilitate deployment of the application 102, including, for example, monitoring tasks, e-mail and alert notification tasks, operations that pre-configure a virtual machine, operations performed prior to provisioning a virtual machine, and other scripting operations.

The example deployment director 122 of FIG. 1 orchestrates execution of the example deployment profile 136 for the application 102 in coordination with the example virtual machines 114 included in the deployment. The example deployment director 122 communicates with the cloud computing platform provider 110 via the example cloud interface 126 to provision and configure the example virtual machines 114 in the deployment environments 112, as specified by the deployment profile 136. In some examples, the deployment director 122 separates the deployment profile 136 into local deployment profiles for each one of the virtual machines 114. In the illustrated example, the deployment director 122 maintains a central state of the deployment process that specifies the dependencies at deployment-time between tasks to be performed across the virtual machines 114 in a specified order. For example, the deployment director 122 may send a message to one or more of the virtual machines 114 when deployment-time dependencies in their respective local deployment profiles are satisfied.

In the illustrated example of FIG. 1, the cloud interface 126 provides a communication abstraction layer by which the application director 116 may communicate with, for example, a heterogeneous mixture of cloud provider(s) 110 and deployment environment(s) 112. In the illustrated example, the deployment director 122 provides the virtual machines 114 with a series of tasks specific to the respective virtual machines 114 (e.g., a local deployment profile). The tasks may be scripts that are executed by the respective virtual machines 114 to install, configure, and/or start one or more nodes. For example, a task may be a script that, when executed by the virtual machines 114, causes the respective virtual machines 114 to retrieve and install particular software packages from, for example, a Git repository, a package manager, and/or other application component resources.

In the illustrated example, the deployment director 122 coordinates with the virtual machines 114 to execute the tasks in an order that observes installation dependencies between the virtual machines 114 according to the deployment profile 136. For example, in the development deployment environment 112a, the example load balancer node 130 is executed by the virtual machine 114a, and the appserver node 132 and the database node 134 are executed by the virtual machine 114b. The virtual machine 114a of the illustrated example is configured based on the deployment profile 136 to coordinate execution of tasks to deploy the load balancer node 130 to run in the development deployment environment 112a. The virtual machine 114b of the illustrated example is configured based on the deployment profile 136 to coordinate execution of tasks to deploy the appserver node 132 and the database node 134 to run in the development deployment environment 112a. Although the appserver node 132 and the database node 134 are shown running on the same virtual machine 114b, in other examples, separate virtual machines 114 in the development deployment environment 112a may be provided to run a corresponding one of the appserver node 132 and the database node 134.

To deploy such a multi-tier application, a developer 106, who understands the architecture of the application 102, must coordinate with a system administrator 108, who controls access to the computing resources, to determine which computing resources (e.g., computing, networking, and storage) and software services (e.g., software packages) should be provisioned to support execution of the application 102. At times, it may be necessary to update a deployed application such as the example application 102. For example, a security vulnerability of an application may need to be patched. The developer 106 may create an update profile, as described herein, to update a deployed application. For example, using the deployment profile generator 120, the developer 106 may create an example update profile 140 by modifying properties and/or configurations of a deployed application. For example, the update profile 140 may be created by changing a port number, changing a password, changing security certificates, changing tasks, increasing (e.g., scaling-out) the number of nodes in a node cluster, decreasing (e.g., scaling-in) the number of nodes in a node cluster, etc.

In the illustrated example, while creating the update profile 140, the developer 106 inputs modifications to the deployment profile 136 in the development deployment environment 112a. These modifications are stored in the update profile 140. Once the update profile 140 is created, the developer 106 may apply the update profile 140 to the deployments in a deployment environment 112a to update the application deployment. The developer 106 may also want to apply the update profile 140 to the one or more other deployment environments 112 in which the application is deployed.

In the illustrated example of FIG. 1, the profile promotion handler 124 includes an example profile promoter 146 to enable a developer 106 to "promote" an update profile for deployments in a same deployment environment and/or across multiple deployment environments. In the illustrated example, the profile promotion handler 124 stores the update profile 140 in an example promotion repository 144 for subsequent use. When an update profile 140 is promoted, deployments of the same application (e.g., all other deployments) are notified of the update profile 140.

The example profile promoter 146 of FIG. 1 facilitates managing update profiles. The example profile promoter 146 of the illustrated example enables a user to "promote" an update profile across multiple deployment environments. For example, after developing the update profile 140 in the development deployment environment 112a, the developer 106 may wish to update the application 102b in the testing deployment environment 112b using the update profile 140. For example, the testing deployment environment 112b may enable the developer 106 to more thoroughly test the update profile 140 than what is possible in the development deployment environment 112a such that the update can be validated prior to deployment to the production deployment environment 112d or another deployment environment.

In the illustrated example of FIG. 1, the profile promoter 146 stores a master copy 142 of the update profile 140 in the promotion repository 144 and then deploys the update profile 140 to selected ones of the deployment environments 112. The example profile promoter 146 logs the promotion in a data structure such as a lookup table in the promotion repository 144. In this manner, the profile promoter 146 maintains a log of which update profile 140 is deployed and into which deployment environment 112 the deployment has occurred, as well as a copy (e.g., the example master copy 142) of the update profile 140. "Promoting" an update profile 140 may include rolling back an update process of the deployed application 102 to a stable version. For example, when an update profile is applied to the deployed application 102, the update process may result in a "bug" that was previously unknown to the developer 106 and render the deployed application 102 unusable in one of the deployment environments 112. Once the update profile (e.g., the update profile resulting in the bug) was promoted and applied to the selected ones of the deployment environments and the bug is identified, the developer 106 may promote a previous version of the update profile or an alternative update profile so that the deployed application rolls back to a stable version that does not include bug.

In the illustrated example, the application director 116 (and/or component(s) of the application director 116 such as the profile promotion handler 124) may be running in one or more of the virtual machines 114 and may be used by the developer 106 and/or the administrator 108 of a deployment environment 112. When an update profile is "promoted" to the deployment environment managed by the administrator 108 (e.g., by the developer 106), the administrator 108 of the deployment environment receives a notification of the update. To prevent malicious update profiles from being applied to deployments, the example profile promotion handler 124 also includes an example promotion deployer 148 to enable an administrator 108 to accept, review, apply or reject a received update profile prior to deployment of the update profile 140 in the deployment environment 112 managed by the administrator 108. In this manner, an administrator 108 is able to maintain control over the deployments in the deployment environments 112 managed by the respective administrator 108. For example, the administrator 108 may request more information about the update profile 140 before processing the update profile 140. In other examples, the administrator 108 may manually apply the update profile 140. In still other examples, the administrator 108 may accept the update profile 140, but modify the update profile 140 prior to deployment in the deployment environment 112 managed by the administrator 102. When the administrator 108 decides to review, apply and/or accept the update profile 140, the promotion deployer 148 creates and stores a local copy of the update profile 140. By storing a local copy of the update profile 140, the update profile 140 may be edited (e.g., changed) without affecting the update profile 140 deployed to the other ones of the deployment environments 112.

When the update profile 140 is reviewed, applied and/or accepted, the example promotion deployer 148 of the illustrated example performs a compatibility check to confirm that the virtual machines 114 in the deployment environments 112 in which the update profile is to be applied are eligible for (e.g., compatible with) the update profile 140 prior to deploying the deployment profile 136 to the respective deployment environment 112. For example, the deployment profile 136 may include tasks to install, configure and start a database node that runs on a Microsoft Windows® operating system, while the virtual machines 114 in the deployment environment 112 execute a Linux® operating system. The example promotion deployer 148 alerts the user (e.g., the administrator 108) via, for example, audio and/or visual notifications when the attempts to apply an incompatible deployment profile (e.g., the deployment profile 136) to the deployment environment 112.

As described above, FIG. 1 depicts the example cloud computing environment 100 in which a deployed application can be updated across multiple deployment environments 112. The example profile promoter 148 receives selection of the update profile 140 and identifies deployment environments 112 in which to deploy the update profile 140. The example profile promoter 148 also maintains a log of update profiles 140, including an identification of when the update profile 140 is updated, to which deployment environments 112 the update profile 140 is promoted, and which version (e.g., copy) of the update profile 140 was promoted.

When the update profile 140 is promoted, the example promotion deployer 148 at each of the selected ones of the example deployment environments 112 makes a decision on whether to accept, review, apply or reject the example update profile 140 independent of the other deployment environments 112. For example, a developer 106 may develop the update profile 140 in the first deployment environment 112 and, using the example profile promoter 146, the developer 106 may promote the update profile 140 to a second and third ones of the deployment environment 112. The example profile promoter 146 logs the promotion including which version of the update profile 140 was promoted and to which deployment environments 112 the update profile 140 was promoted. The example profile promoter 146 stores a copy of the update profile 140 (e.g., the master copy 142) in the promotion repository 144 when the update profile 140 is promoted. A first administrator 108 of the second deployment environment 112 may then accept and apply the update profile 140 to the deployments in the second deployment environment 112 while a second administrator 108 of the third deployment environment 112 may reject the update profile 140. The example promotion deployer 148 for the example second deployment environment 112 performs a compatibility check with the example update profile 140, and then stores a copy of the update profile 140 (e.g., a local copy of the update profile 140) and applies the update profile 140 to the deployments in the second deployment environment 112. In some examples, the promotion deployer 148 stores a local copy of the update profile 140 when the update profile 140 is promoted, regardless of whether or not the administrator 108 accepts, reviews, applies or rejects the update profile 140.

While an example manner of implementing the application director 116 is illustrated in FIG. 1, one or more of the elements, processes and/or devices illustrated in FIG. 1 may be combined, divided, re-arranged, omitted, eliminated and/or implemented in any other way. Further, the example topology generator 118, the example deployment profile generator 120, the example deployment director 122, the example profile promotion handler 124, the example cloud interface 126, the example profile promoter 146, the example promotion deployer 148 and/or, more generally, the example application director 116 of FIG. 1 may be implemented by hardware, software, firmware and/or any combination of hardware, software and/or firmware. Thus, for example, any of the example topology generator 118, the example deployment profile generator 120, the example deployment director 122, the example profile promotion handler 124, the example cloud interface 126, the example profile promoter 146, the example promotion deployer 148 and/or, more generally, the application director 116 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example topology generator 118, the example deployment profile generator 120, the example deployment director 122, the example profile promotion handler 124, the example cloud interface 126, the example profile promoter 146 and/or the example promotion deployer 148 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 116 of FIG. 1 may include one or more elements, processes and/or devices in addition to, or instead of, those illustrated in FIG. 1, and/or may include more than one of any or all of the illustrated elements, processes and devices.

Figure 2:
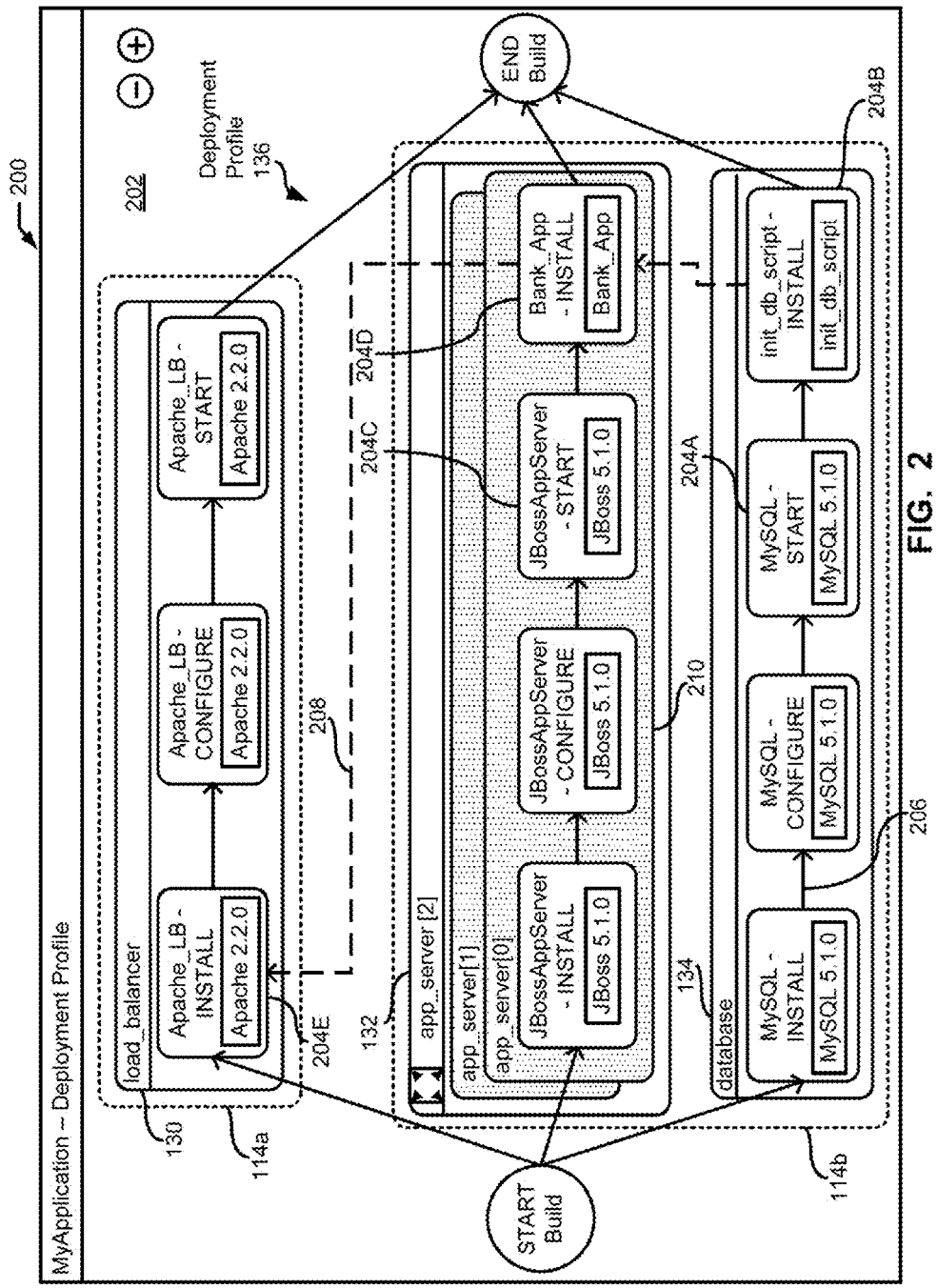
FIG. 2 illustrates an example graphical user interface generated by the example application director of FIG. 1 to generate an application blueprint for an application.

FIG. 2 illustrates an example deployment profile generator graphical user interface (GUI) 200 that may be presented by the example deployment profile generator 120 of FIG. 1. The example deployment profile generator GUI 200 displays a representation of the example deployment plan 136 for a three-tiered application. In the illustrated example of FIG. 2, the deployment profile generator GUI 200 includes a canvas 202 presenting the example virtual machine 114*a*, including the example load balancer node 130, the example virtual machine 114*b*, including the example app server node 132 executing a web application (e.g., "bank_app"), and an example MySQL database node 134, which represent the different virtual machines and nodes of the example application 102*a* to be deployed to the deployment environment 112*a*. In the illustrated example, each node 130, 132, 134 includes tasks (e.g., an example task 204A, an example task 204B, an example task 204C, an example task 204D and an example task 204E) representing action scripts to be executed on the corresponding virtual machines 114*a*, 114*b*.

As discussed above, when the example developer 106 (FIG. 1) develops the application blueprint 128 for the application 102, the developer 106 may specify one or more dependencies between application components to declare a relationship between the application components. Dependencies may be used to plan deployment of the application 102 by defining a deployment order for application components (e.g., that indicates whether deployment tasks for one item will wait to run until the tasks for the other item has finished).

Dependencies are identified by the developer 106 by, for example, defining them in the catalog 120. A dependency may be an intra-node dependency or an inter-node dependency. A dependency between application components may be defined between application components in the same node (e.g., an "intra-node" dependency) to represent that, at that node, tasks for one application component are performed after tasks for the other application component. In the illustrated example, intra-node dependencies are illustrated by solid directional lines between two tasks. Alternatively, dependencies between application components may be defined between application components in different nodes (e.g., "inter-node" dependencies) such that tasks for an application component at a first node are performed after tasks of an application component at a second node have been completed. In the illustrated example, inter-node dependencies are illustrated by dashed directional lines between two tasks.

In the illustrated example of FIG. 2, the deployment plan 136 of FIG. 2 specifies that a task does not begin execution until a preceding task, as indicated by solid directional lines 206, has been completed. For example, a virtual machine (labeled as "database") executes action scripts for installing (e.g., "MySQL-INSTALL"), configuring (e.g., "MySQL-CONFIGURE"), and starting (e.g., "MySQL-START") a MySQL database service. Because of the dependency implied between the MySQL database and SQL script (e.g., the SQL script may not be executed before the MySQL database is deployed), the example task 204B for executing the "init_db_script" SQL script (e.g., "init_db_script-INSTALL") is placed after the last task for deploying the MySQL database (e.g., "MySQL-START") (e.g., the example task 204A) has been completed. Similarly, the example task 204D for deploying the bank application (e.g., "Bank_App-INSTALL") is placed after the last task for deploying the application server (e.g., "JBossAppServer-START") (e.g., the example task 204C) has been completed.

In the illustrated example of FIG. 2, the deployment plan 136 also specifies inter-node dependencies between the nodes, as indicated by a dashed directional line 208. For example, since a load balancer usually cannot be configured until a web application is running, in the three-tiered application 102 of FIG. 2, the example deployment plan 136 specifies that the example task 204E for deploying the load balancer (e.g., "Apache_LB-INSTALL") does not begin execution until the example task 204D for deploying the web application (e.g., "bank_app-INSTALL") is completed.

A single appserver node 132 in the illustrated example represents a cluster of appserver nodes 132. For example, the example appserver node 132 of FIG. 2 is a cluster node including two sub-nodes (e.g., "app_server[0]" and "app_server[1]"). In some examples, the sub-nodes may include additional sets of deployment-time dependencies. For example, the deployment plan 136 may indicate that the task 204D (e.g., "Bank_App-INSTALL") complete in all sub-nodes (e.g., "app_server[0]" and "app_server[1]") before the task 204E (e.g., "Apache_LB-INSTALL") may begin. Alternatively, each node in a cluster of the nodes may be represented by a separate virtual machine 114.

Figure 3:
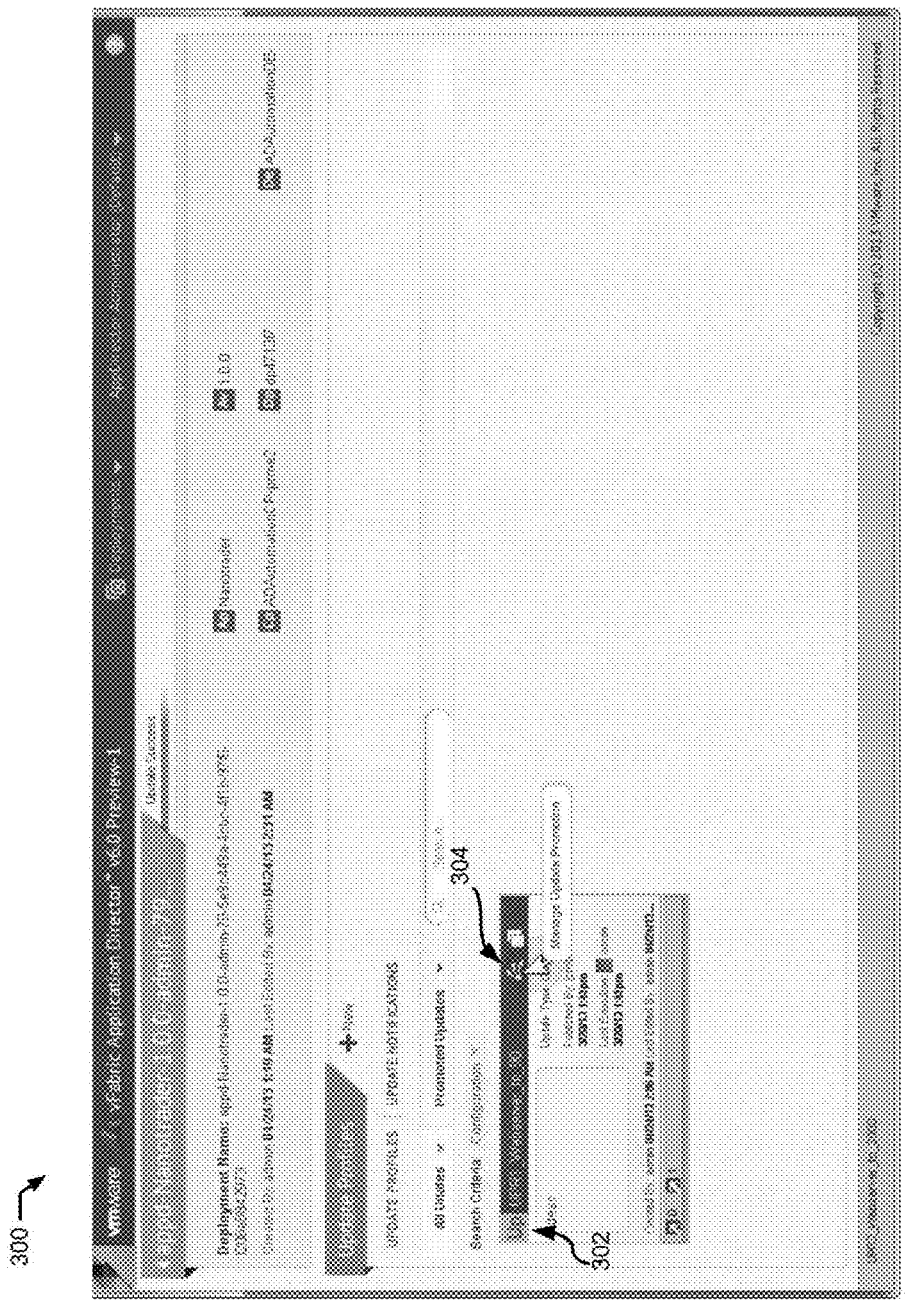
FIGS. 3 and 4 illustrate example graphical user interfaces generated by the example profile promoter of FIG. 1 to manage update profile promotions.

FIG. 3 depicts an example profile promoter GUI 300 that may be presented by the example profile promoter 146 of FIG. 1. The example profile promoter GUI 300 is presented by the example profile promoter 146 to enable users (e.g., the developer 106) to manage update profile promotions. In the illustrated example, the profile promoter GUI 300 is populated with information about an example update profile 302 (e.g., UPR1_Webserver_to_90) that is installed in several deployment environments (e.g., the example deployment environments 112 of FIG. 1) and that may be promoted. In the illustrated example, the profile promoter GUI 300 is provided with a user-selectable 'Manage Update Promotion' GUI control 304 that is displayed to allow a developer 106 to specify whether the update profile 302 is to be promoted across one or more deployment environments. In the illustrated example, when the 'Manage Update Promotion' GUI control 304 is selected in the example profile promoter 146 by a user, the profile promoter 146 detects the selection (e.g., via a flag that is set, a value that is set to one, etc.) of the 'Manage Update Promotion' GUI control 304 and enables the update profile 302 to be promoted to one or more deployment environments 112. The 'Manage Update Promotion' GUI control 304 of the illustrated example is a linked selectable icon. Alternatively, the 'Manage Update Promotion' GUI control 304 may be a text box, a check box, etc.

Figure 4:
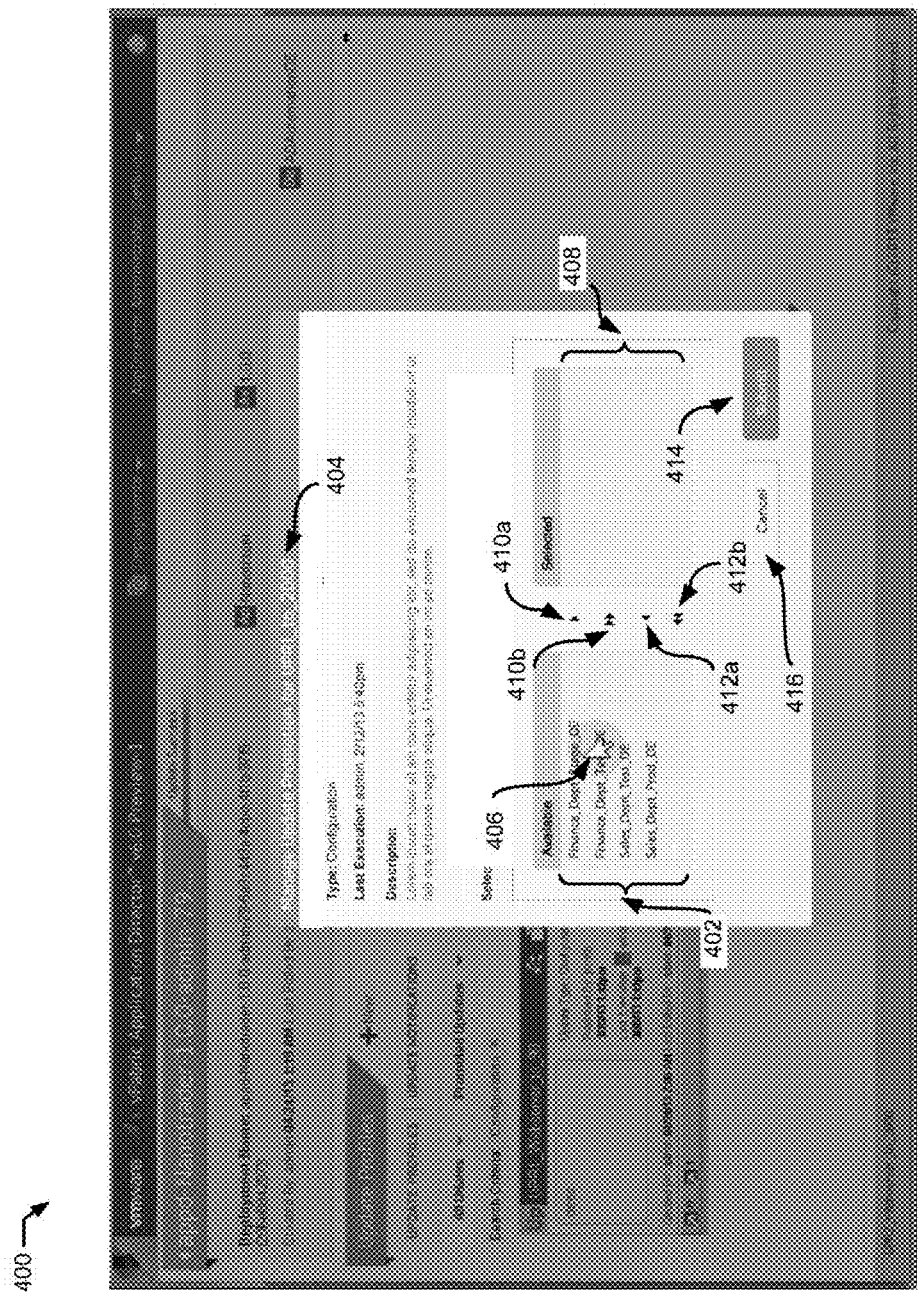

FIG. 4 depicts another example profile promoter GUI 400 that may be presented by the example profile promoter 146 of FIG. 1. The example profile promoter GUI 400 is presented by the example profile promoter 146 to enable users (e.g., the developer 106) to select example available deployment environments 402 to promote the update profile 302 of FIG. 3. When a user of the example profile promoter 146 selects the 'Manage Update Promotion' GUI control 304 in the profile promoter GUI 300 of FIG. 3, the profile promoter GUI 400 presents the user with information about an available update profile 404 (e.g., UPR1_to_2000) that may be applied to the update profile 302. For example, the update profile 404 may be for the same component and/or service as the update profile 302. In such instances, when the update profile 404 is available for promotion, selecting the 'Manage Update Promotion' GUI control 304 in the profile promoter GUI 300 of FIG. 3 results in presenting the information about the update profile 404. The profile promoter GUI 400 displays a listing of the example available deployment environments 402 selectable by the user of the example profile promoter 146 to promote the selected update profile 404. In this manner, administrators of the selected deployment environments 402 can be notified of the update profile 404 and that a deployment in the deployment environment managed by the respective administrators is eligible for an update. In some examples, the deployment environments 402 may include the example deployment environments 112 of FIG. 1. In the illustrated example, a human interface device pointer 406 is shown selecting an available one of deployment environments 402 such that the selected one of the example deployment environments 402 displayed in the profile promoter GUI 400 is added by a user to the listing of the selected deployment environments 408 in which the selected update profile 404 is to be promoted.

The profile promoter GUI 400 of the illustrated example is provided with an example single addition control 410a and an example multiple addition control 410b to add ones of the selected deployment environments 402 in which the selected update profile 404 is to be promoted. When a user of the example profile promoter 146 selects the example single addition control 410a, the selected one of the available deployment environments 402 is moved to the listing of the selected deployment environments 408. When the user selects the example multiple addition control 410b, the selected ones of the available deployment environments in the example listing of available deployment environments 402 are moved to the example listing of the selected deployment environments 408.

The example profile promoter GUI 400 includes an example single removal control 412a and an example multiple removal control 412b to remove selected ones of the deployment environments from the example listing of selected deployment environments 408. When the user selects the example single removal control 412a, the selected one of the deployment environments from the example listing of selected deployment environments 408 is removed from the example listing of the selected deployment environments 408 and moved to the example listing of the available deployment environments 402. When the example user selects the multiple removal control 412b, the selected ones of the deployment environments in the example listing of selected deployment environments 408 are removed from the example listing of the selected deployment environments 408 and moved to the example listing of the available deployment environments 402.

A user of the example profile promoter 146 may use the human interface device pointer 406 to select an example update promotion 'Submit' control 414 such that selected ones of the example deployment environments included in the example listing of selected deployment environments 408 in the profile promoter GUI 400 are the deployment environments in which the selected update profile 404 is to be promoted. Alternatively, the user may use the human interface device pointer 406 to select an example 'Cancel' control 416 to cancel the manage update promotion process. In the illustrated example, when the update promotion 'Submit' control 404 is selected, the deployment environments included in the listing of selected deployment environments 408 are stored in a data structure such as a lookup table in the example promotion repository 144. In some examples, when the update promotion 'Submit' control 404 is selected, the deployment environments included in the listing of selected deployment environments 408 are stored with the selected update profile 404.

Figure 5:
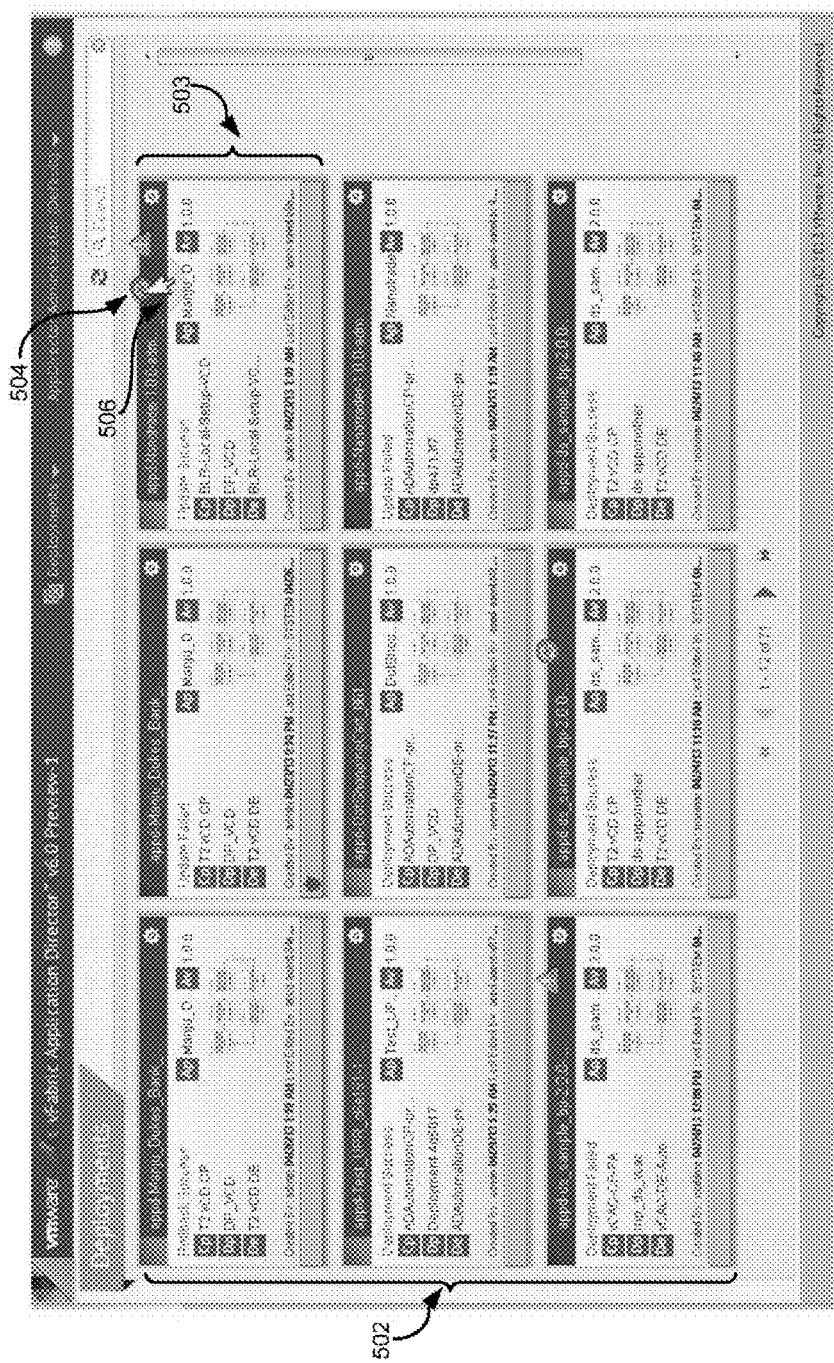
FIGS. 5 and 6 illustrate example graphical user interfaces generated by the example promotion deployer of FIG. 1 to deploy an update profile in a deployment environment of FIG. 1.

FIG. 5 depicts an example promotion deployer GUI 500 presented by the example promotion deployer 148 of FIG. 1. The example promotion deployer GUI 500 is presented by the example promotion deployer 148 to notify users (e.g., the administrator 108) of example deployments in the deployment environment managed by the user (e.g., the administrator 108) that have a promoted update profile that is available to be applied. The example promotion deployer GUI 500 displays example deployment information 502 for nine example deployments included in the user's deployment environment. The example promotion deployer GUI 500 includes an example notification control 504 to notify a user when an update profile (e.g., an example update profile identified in information block 503) has been promoted and is available for deployment in the user's deployment environment. In the illustrated example, a human interface device pointer 506 is shown selecting the notification control 504. In the illustrated example, selecting the notification control 504 causes a selected one of the deployments identified in the example deployment information 502 displayed in the example promotion deployer GUI 500 to be identified as the deployment with an available update profile that the user wants to review, accept, and apply the update profile 503 or reject the update profile 503.

Figure 6:
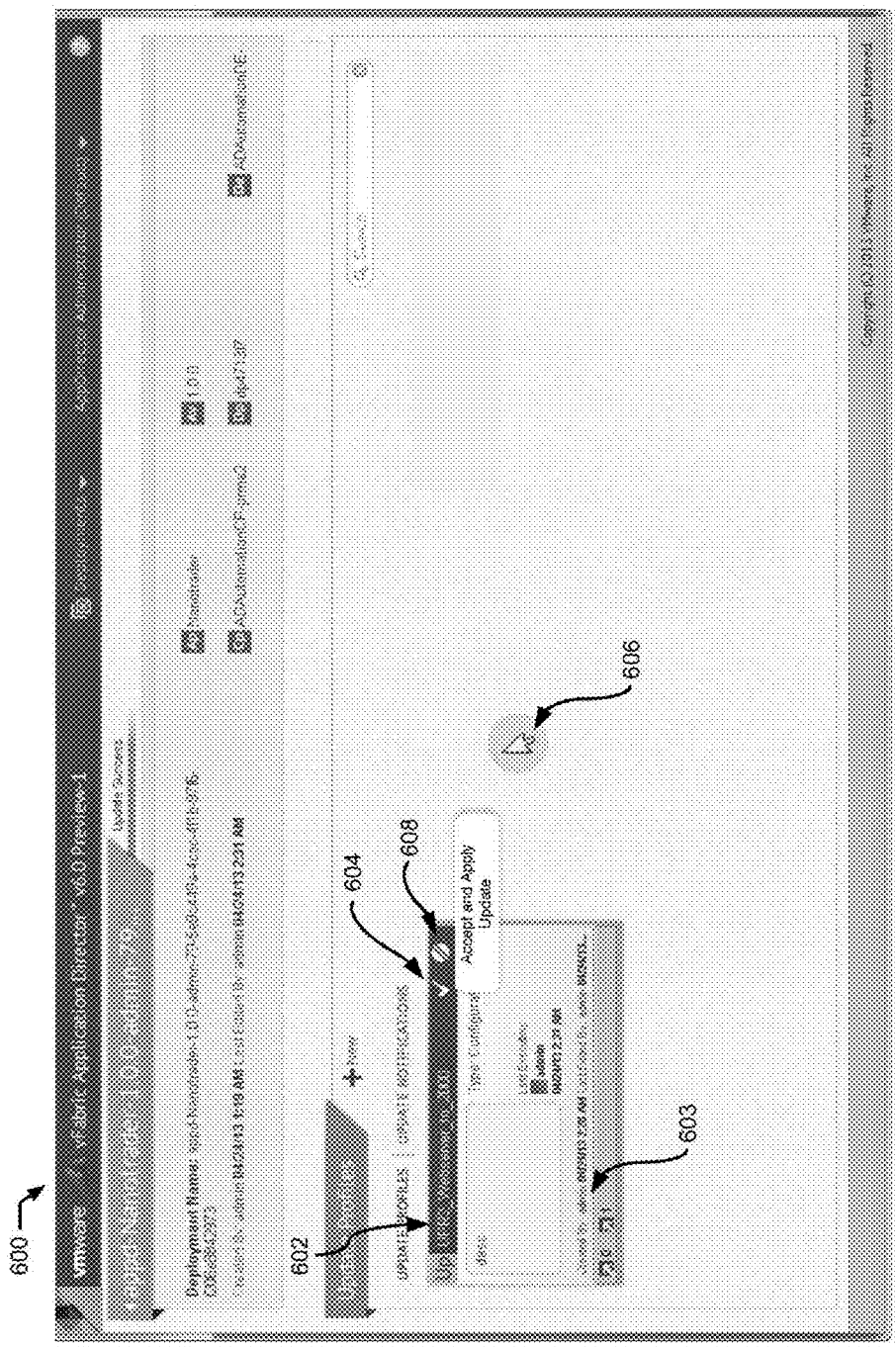

FIG. 6 depicts another example promotion deployer GUI 600 presented by the example promotion deployer 148 of FIG. 1. The example promotion deployer GUI 600 is presented by the example promotion deployer 148 to allow a user to accept, review, apply or reject an update profile identified in profile label 602. The example update profile identified in profile label 602 includes information about the update profile such as a creator identified at creator label 603. In the illustrated example, the promotion deployer GUI 600 includes a user-selectable 'Accept and Apply Update' control 604 that is displayed to allow a user to specify that the update profile identified in the profile label 602 is to be applied to deployments in the deployment environment. In some examples, when the user selects the 'Accept and Apply Update' control 604 (e.g., via human interface device pointer 606), the promotion deployer 148 initiates a compatibility check to determine whether the update profile identified in the profile label 602 is compatible with the deployments in the deployment environment. In the illustrated example, when the user selects the 'Accept and Apply Update' control 604, the promotion deployer 148 creates a local copy of the update profile identified in the profile label 602 that may be used to apply the update profile, modify the update profile, etc. In the illustrated example, the promotion deployer GUI 600 includes a user-selectable 'Reject' control 608 that is displayed to allow a user to specify that the update profile identified in the profile label 602 is not to be applied to deployments in the deployment environment. For example, the administrator 108 may not know and/or trust the source of the update profile and/or the creator of the update profile and may elect to reject deployment of the untrusted update profile.

Figures 7A, 7B:
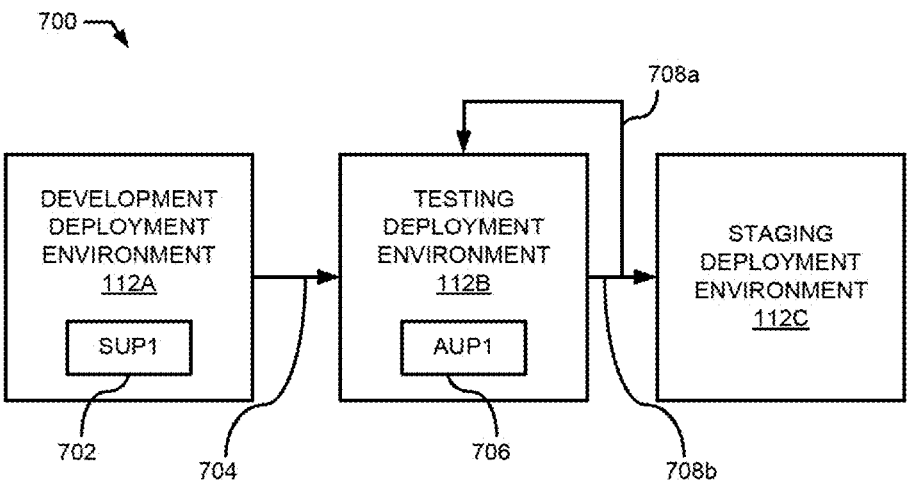
FIG. 7A is a block diagram illustrating an example flow for promoting an update profile.
FIG. 7B is an example data table representing update profile promotions that may be stored by the example profile promoter of FIG. 1 in the example promotion repository of FIG. 1.

FIG. 7A is a block diagram 700 illustrating an example flow for promoting an update profile. In the illustrated example of FIG. 7A, an example update profile 702 ("SUP1") is promoted 704 from the example development deployment environment 112a to the example testing deployment environment 112b. When the example update profile 702 ("SUP1") is promoted, the update profile 702 is a source profile and a copy profile (e.g., a copy of the master profile) is made available to the testing deployment environment 112b. In the illustrated example, the copy profile is renamed as update profile 706 ("AUP1") and applied at the testing deployment environment 112b. At a later time, the update profile 706 may be promoted to one or more additional deployment environments. For example, in the illustrated example, the update profile 706 is promoted 708a to itself (e.g., the testing deployment environment 112b to, for example, re-apply the update profile in the testing deployment environment 112b) and is promoted 708b to the staging deployment environment 112c. Copies of the update profile 706 are made available to the testing deployment environment 112b to apply and to the staging deployment environment 112c to apply.

FIG. 7B is an example data table 720 representing update profile promotions that may be stored by the example profile promoter 146 of FIG. 1 in the example promotion repository 144 of FIG. 1. The example data table 720 identifies an entry identifier 722, a source profile identifier 724, a copy profile identifier 726, and a deployment environment identifier 728. In the illustrated data table 720, the entry identifier 722 identifies an entry number in the data table 720. The source profile identifier 724 identifies the update profile (e.g., the example update profile 140 of FIG. 1) that is being promoted. The copy profile identifier 726 identifies the copy of the master copy (e.g., the example master copy 142 of FIG. 1) made available to deployment environments. The deployment environment identifier 728 identifies the corresponding deployment environment the copy of the master copy was made available.

The data table 720 of FIG. 7B corresponds to the example flow diagram 700 of FIG. 7A. For example, row 730 of the data table 720 indicates that the update profile ("SUP1") (e.g., the update profile 702) was promoted to the testing deployment environment and a copy profile (CUP1) of the source profile was made available to the testing deployment environment. Example rows 732 and 734 indicate that the update profile ("AUP1") (e.g., the update profile 706) was promoted to the testing deployment environment and the staging deployment environment, and that a copy profile of the source profile ("CUP2") was made available to the testing deployment environment and the staging deployment environment, respectively. In the illustrated example, the copy profile ("CUP2") is the second copy made and identified accordingly.

Figures 8A, 8B:
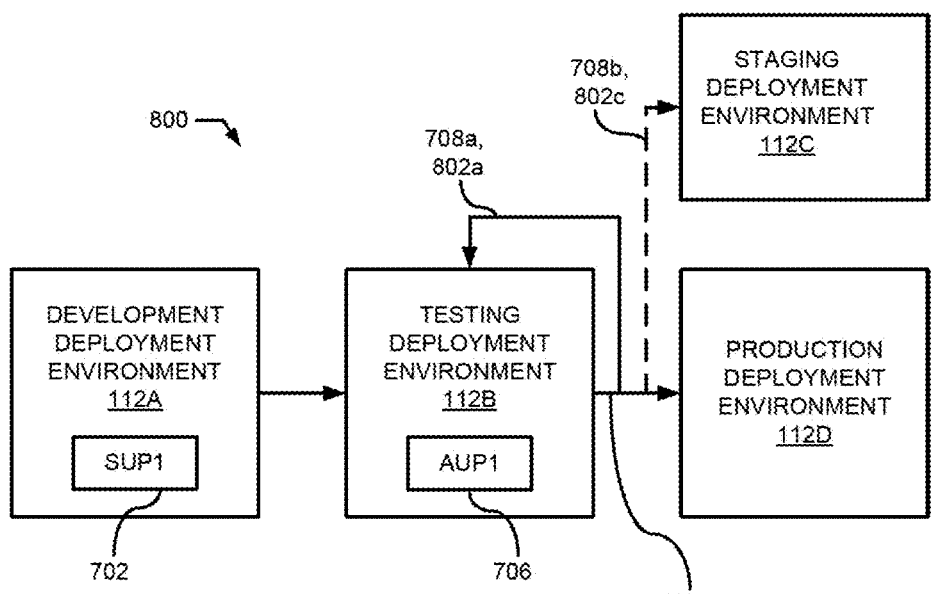
FIG. 8A is a block diagram illustrating an example flow for promoting an update profile.
FIG. 8B is an example data table representing update profile promotions that may be stored by the example profile promoter of FIG. 1.

FIG. 8A is a block diagram 800 illustrating an example flow for promoting an update profile. In the illustrated example of FIG. 8A, during a first promotion, an example update profile 702 ("SUP") is promoted from the development deployment environment 112a to the testing deployment environment 112b (e.g., promotion 704), and during a second promotion, the update profile 706 ("AUP1") is promoted from the testing deployment environment 112b to the testing deployment environment 112b (e.g., promotion 708a) and the staging deployment environment 112c (e.g., promotion 708b), as illustrated in FIG. 7A. In the illustrated example, a third promotion includes promoting the update profile 706 ("AUP1") a second time (e.g., promotions 802a, 802b, and 802c). When the update profile 706 ("AUP1") is promoted the second time, the update profile 706 ("AUP1") is treated as the source profile and a copy profile (e.g., a copy of a master profile) is made available to the testing deployment environment 112b (e.g., promotion 802a), and the production deployment environment 112d (e.g., promotion 802b). However, during the third promotion, the update profile 706 is withdrawn from the staging deployment environment 112c (e.g., promotion 802c) as indicated by the dashed line of 802c. In some examples, when the update profile 706 is withdrawn from the staging deployment environment 112c (e.g., promotion 802c), the application deployment in the staging deployment environment 112c "rolls back" to a previous update profile.

FIG. 8B is an example data table 810 representing update profile promotions that may be stored by the example profile promoter 146 of FIG. 1 in the example promotion repository 144 of FIG. 1. The example data table 810 identifies an entry identifier 812, a source profile identifier 814, a copy profile identifier 816, and a deployment environment identifier 818. In the illustrated data table 810, the entry identifier 812 identifies an entry number in the data table 810. The source profile identifier 814 identifies the update profile (e.g., the example update profile 140 of FIG. 1) that is being promoted. The copy profile identifier 816 identifies the copy of the master copy (e.g., the example master 142 of FIG. 1) made available to deployment environments. The deployment environment identifier 818 identifies corresponding deployment environment the copy of the master copy was made available, respectively.

The example data table 810 corresponds to the example flow diagram 800 of FIG. 8A. For example, rows 820, 822 and 824 correspond to the third promotion 802a, 802b, 802c (e.g., the second promotion of the update profile 706 ("AUP1"). Example rows 820 and 822 indicate that the update profile ("AUP1") (e.g., the update profile 706) was promoted to the testing deployment environment (e.g., the testing deployment environment 112b) and the production deployment environment (e.g., the production deployment environment 112d) and that a copy profile of the source profile ("CUP3") is made available to the testing deployment environment and the production deployment environment, respectively. In the illustrated example, the copy profile ("CUP3") is the third master copy made and identified accordingly. Row 824 indicates that the second copy profile ("CUP2") was withdrawn from the staging deployment environment 112c, corresponding to the update profile ("AUP1").

Figure 9:
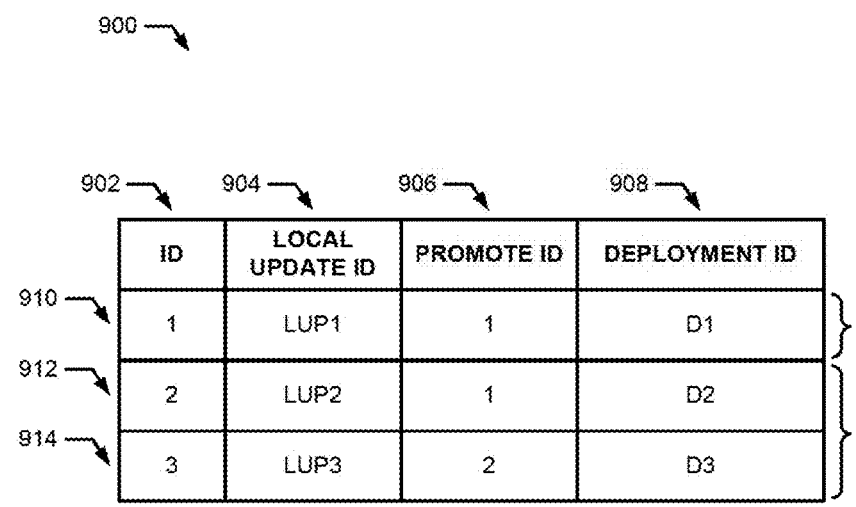
FIG. 9 is an example data table representing local update profile promotions that may be stored by the example profile promoter when an update profile is accepted and or applied to a deployment environment.

FIG. 9 is an example data table 900 representing local update profile promotions that may be stored by the example profile promoter 146 when an update profile is accepted and/or applied to a deployment environment. The example data table 900 identifies an entry identifier 902, a local update identifier 904, a promote identifier 906 and a deployment identifier 908. For example, rows 910 and 912 of FIG. 9 indicate that during a first promotion, the master copy was accepted and/or applied in a first deployment environment ("D1") and a second deployment environment ("D2"). Rows 910 and 912 also indicate that first and second local copies of a promoted update profile ("LUP1" and "LUP2") were made in the first deployment environment ("D1") and the second deployment environment ("D2"), respectively. Row 914 indicates that the second promotion was accepted and/or applied in a third deployment environment ("D3") and that a third local copy of a promoted update profile ("LUP3") was made in the third deployment environment ("D3").

Figure 10:
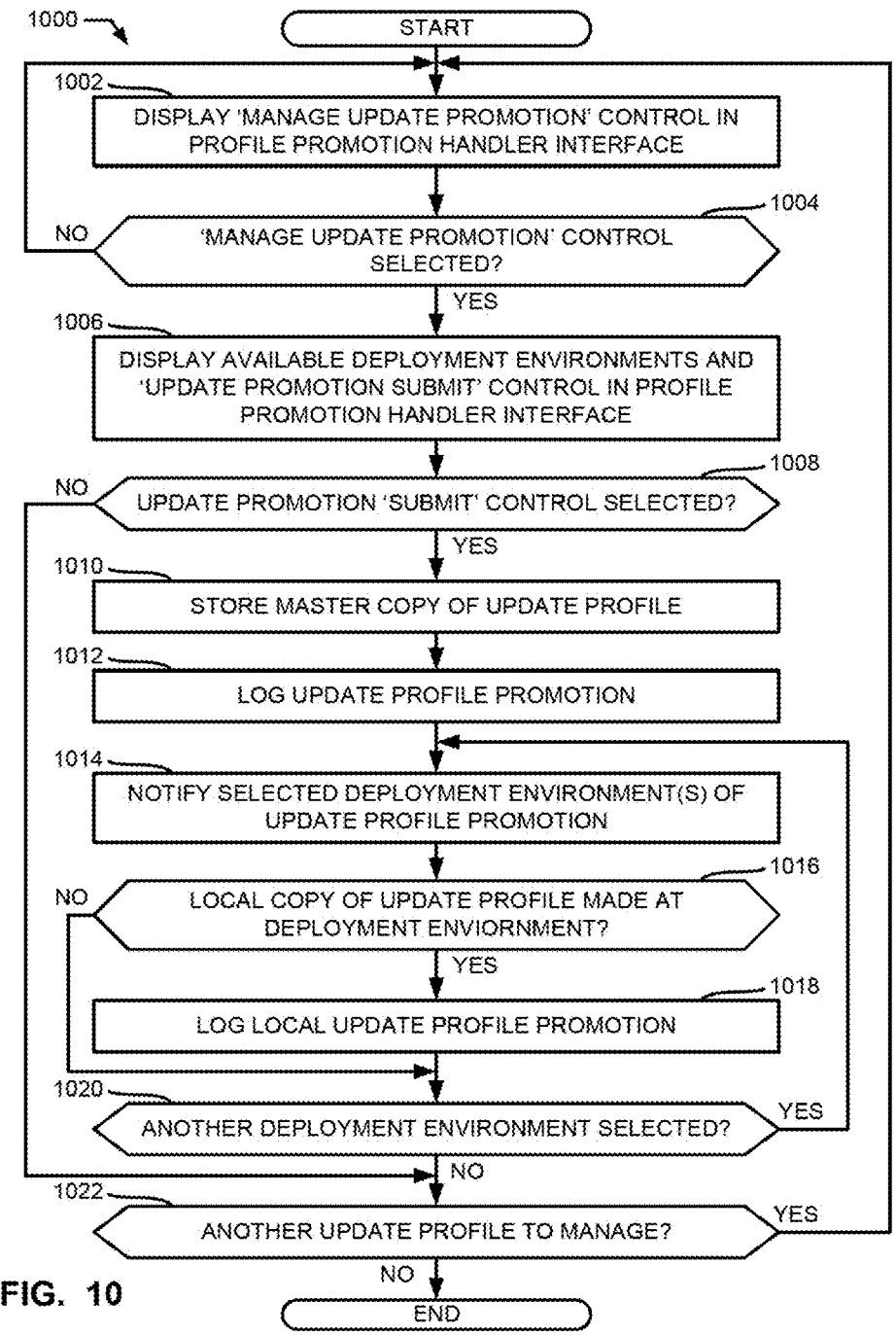
FIGS. 10 and 11 are flow charts representative of example machine-readable instructions that may be executed to update application deployments in the example cloud computing environment of FIG. 1.
Figure 11:
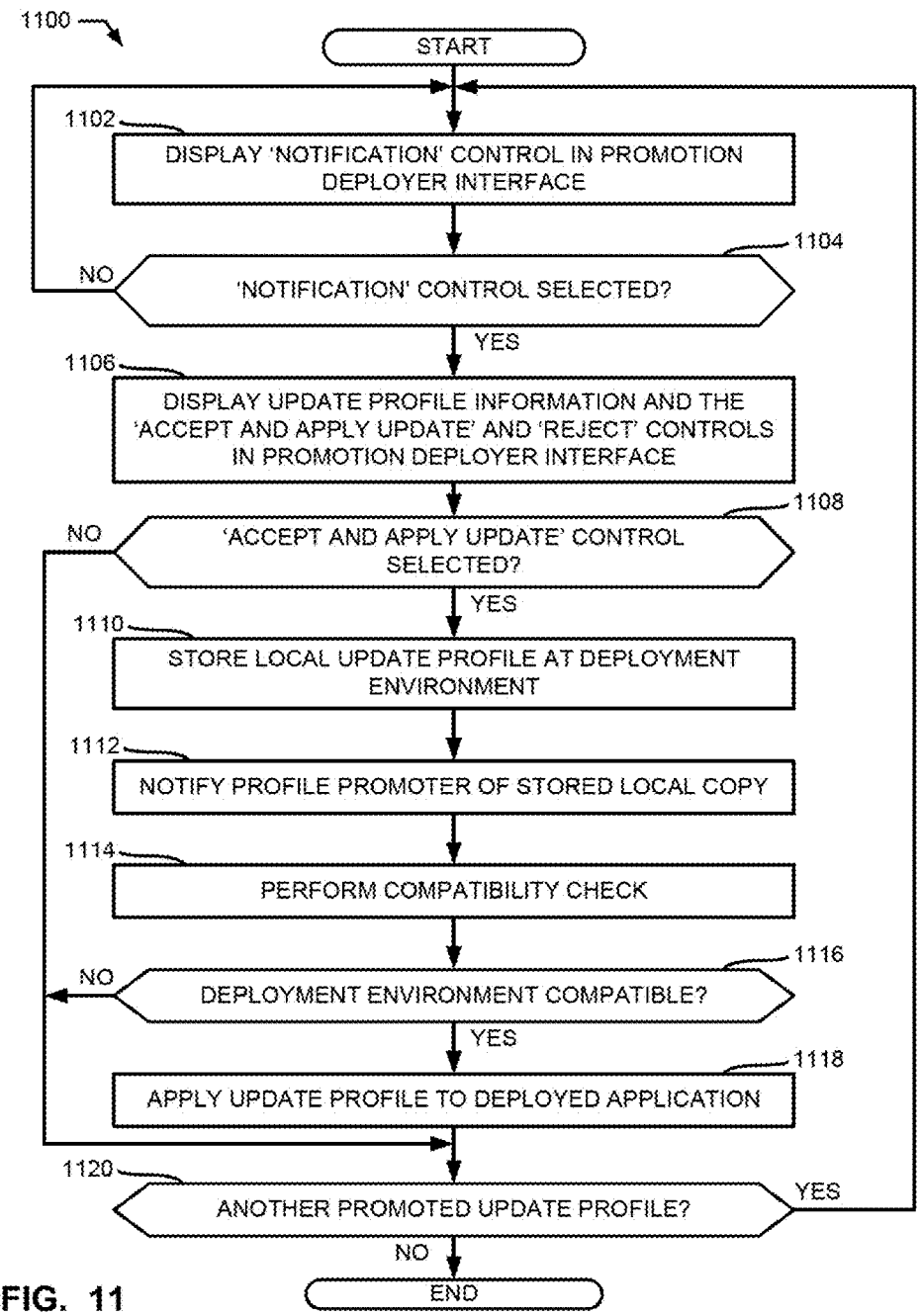

Flowcharts representative of example machine readable instructions for implementing the profile promotion handler 124 of FIG. 1 are shown in FIGS. 10 and 11. In this example, the machine readable instructions comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Bin-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 10 and 11, many other methods of implementing the example profile promotion handler 124 may alternatively be used. For example, the order of execution of the blocks may be changed, and/or some of the blocks described may be changed, eliminated, or combined.

As mentioned above, the example processes of FIGS. 10 and 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program of FIG. 10 begins at block 1002 at which the example profile promotion handler 124 (FIG. 1) displays the user-selectable 'Manage Update Promotion' control 304 in the example profile promoter GUI 300 (FIG. 3). At block 1004, the example profile promoter 146 (FIG. 1) determines whether the 'Manage Update Promotion' control 304 has been selected. If, at block 1004, the example profile promoter 146 determines that the 'Manage Update Promotion' control 304 has not been selected, then control returns to block 1002 to display the user-selectable 'Manage Update Promotion' control 304. At block 1006, the example profile promoter 146 displays the user-selectable deployment environments available to promote the update profile 140 and the user-selectable update promotion 'Submit' control 414 in the example profile promoter GUI 400. At block 1008, the example profile promoter 146 determines whether the update promotion 'Submit' control 414 has been selected. If, at block 1008, the example profile promoter 146 determines that the update promotion 'Submit' control 414 has not been selected, then control proceeds to block 1022 to determine whether there is another update profile available to manage.

If at block 1008, the example profile promoter 146 determines the update promotion 'Submit' control 414 has been selected, then, at block 1010, the profile promoter 146 stores an example master copy 142 of the promoted update profile 140. At block 1012, the example profile promoter 146 logs the promotion of the update profile 140 in the example promotion repository 144 (FIG. 1). For example, the profile promoter 146 may record entries in a data structure (e.g., the example data table 720 of FIG. 7B, the example data table 810 of FIG. 8B) identifying the source update profile (e.g., the update profile promoted), identifying a copy identifier of the master copy, and identifying the ones of the deployment environments 112 selected for applying the promoted update profile 140 (e.g., the listing of selected deployment environments 408 of FIG. 4). At block 1014, the example profile promoter 146 notifies the selected ones of the deployment environments 408 of the promoted update profile 140. At block 1016, the example profile promoter 146 determines whether a local copy of the update profile 140 is made at the selected ones of the deployment environments 408. For example, the profile promoter 146 may obtain a message indicating whether the update profile 140 was reviewed, accepted and applied or rejected at the selected ones of the deployment environments 408. If, at block 1016, the example profile promoter 146 determines that the selected ones of the deployment environments 408 created a local copy of the update profile 140 (e.g., the administrator 108 of the selected ones of the deployment environments 408 selected to review, accept or apply the update profile 140), then, at block 1018, the profile promoter 146 logs the local update profile promotion in a data structure (e.g., the example data table 900 of FIG. 9) in the example promotion repository 144.

If, at block 1016, the example profile promoter 146 determines that a local copy of the update profile 140 was not made at the selected ones of the deployment environments 408 or the profile promoter 146 has logged the local update profile promotion in a data structure at block 1018, then, at block 1020, the profile promoter 146 determines whether there is another selected deployment environment 408 to notify of the promoted update profile 140. If, at block 1020, the profile promoter 146 determines that there is another selected deployment environment 408 to notify, control returns to block 1014 to notify the selected ones of the deployment environments 408 of the promoted update profile 140. If at block 1008, the profile promoter 146 determines that the update promotion 'Submit' control has not been selected (e.g., a user has selected the 'Cancel' control 416 of FIG. 4) or the profile promoter 146 has determined that there is not another selected deployment environment 408 to notify at block 1020, then, at block 1022, the profile promoter 146 determines whether there is another update profile to manage. For example, the profile promoter GUI 300 may display another update profile with the user-selectable 'Manage Update Promotion' control 304. If, at block 1022, the profile promoter 146 determines that the there is another update profile to manage, then, control returns to block 1004 to determine whether the 'Manage Update Promotion' control 304 has been selected fir another update profile. Otherwise, if, at block 1022, the profile promoter 146 determines there is not another update profile to manage, the example process 1000 of FIG. 10 then ends.

The example program of FIG. 11 begins at block 1102 when the profile promotion handler 124 (FIG. 1) displays the user-selectable 'Notification' control 504 in the example promotion deployer GUI 500 of FIG. 5. For example, the promotion deployer 148 (FIG. 1) of a deployment environment may obtain a notification of a promoted update profile for an application deployed in the deployment environment.

At block 1104, the example promotion deployer 148 determines whether the 'Notification' control 504 is selected. For example, using the example human interface device pointer 506 (FIG. 5), the administrator 108 may select the 'Notification' control 504 to review the example update profile 503 included in the list of deployments 502.

If, at block 1104, the example profile deployer 148 determines that the 'Notification' control 504 is not selected, then control returns to block 1102 to display the example promotion deployer GUI 500 of FIG. 5.

If, at block 1104, the example profile deployer 148 determines that the 'Notification' control 504 is selected (e.g., a user wishes to review the update profile), then, at block 1106, the example profile deployer 148 displays additional information about the update profile (e.g., the example update profile identified in profile label 602 of FIG. 6), the example 'Accept and Apply Update' control 604 and the example 'Reject' control 608 in the example promotion deployer GUI 600 of FIG. 6. For example, the additional information about the update profile identified in profile label 602 may include the creator identified at creator label 603 (FIG. 6). Using the example human interface device pointer 606, a user may then select the 'Accept and Apply Update' control 604 to accept and apply the update profile identified in profile label 602, or may select the 'Reject' control 608 to reject applying the update profile identified in profile label 602. In some examples, the promotion deployer GUI 600 may include a user-selectable control to enable the administrator 108 to accept the update profile identified in profile label 602 and modify the update profile identified in profile label 602 locally (e.g., at the deployment environment) prior to applying the update profile identified in profile label 602 and/or the modified update profile identified in profile label 602.

At block 1108, the example promotion deployer 148 determines whether the administrator 108 selected the 'Accept and Apply Update' control 604. If, at block 1108, the example promotion deployer 148 determines that the administrator 108 did not select the 'Accept and Apply Update' control 604 (e.g., the administrator 108 selected the 'Reject' control 608), then control proceeds to block 1120 to determine whether there is another promoted update profile to review, accept and apply or reject.

If, at block 1108, the example promotion deployer 148 determines that the administrator 108 selected the 'Accept and Apply Update' control 604, then, at block 1110, the promotion deployer 148 stores a local copy of the update profile identified in profile label 602 at the deployment environment. For example, the promotion deployer 148 may obtain a copy of the promoted update profile identified in profile label 602 from the example profile promoter 146 (FIG. 1) and store a copy of the promoted update profile identified in profile label 602 in a local repository (e.g., the example promotion repository 144 (FIG. 1)).

At block 1112, the example promotion deployer 148 notifies the example profile promoter 146 that a local copy of the promoted update profile identified in profile label 602 was created and stored in the deployment environment.

At block 1114, the promotion deployer 148 performs a compatibility check between the deployment environment (e.g., the deployed application, the virtual machines included in the deployment environment, etc.) and the update profile identified in profile label 602. For example, the promotion deployer 148 may check whether the virtual machines 114 (FIG. 1) deployed in the deployment environment are able to execute the components of the update profile identified in profile label 602. If, at block 1116, the promotion deployer 148 determines that the deployment environment is compatible with the update profile identified in profile label 602, then, at block 1118, the promotion deployer 148 applies the update profile identified profile label 602 to the deployed application (e.g., all of the instances of the application deployed in the deployment environment).

If, at block 1116, the promotion deployer 148 determines that the deployment environment is not compatible with the update profile identified in profile label 602, or after the promotion deployer 148 applies the update profile identified in profile label 602 at block 1118, then, at block 1120, the promotion deployer 148 determines whether there is another promoted update profile to review, accept and apply or reject. If, at block 1120, the promotion deployer 148 determines that there is another promoted update profile, control returns to block 1102 to display the promotion deployer GUI 500 of FIG. 5 including the user-selectable 'Notification' control 504 for the promoted update profile. Otherwise, if at block 1120, the promotion deployer 148 determines there is not another promoted update profile, the example process 1100 of FIG. 11 then ends.

Figure 12:
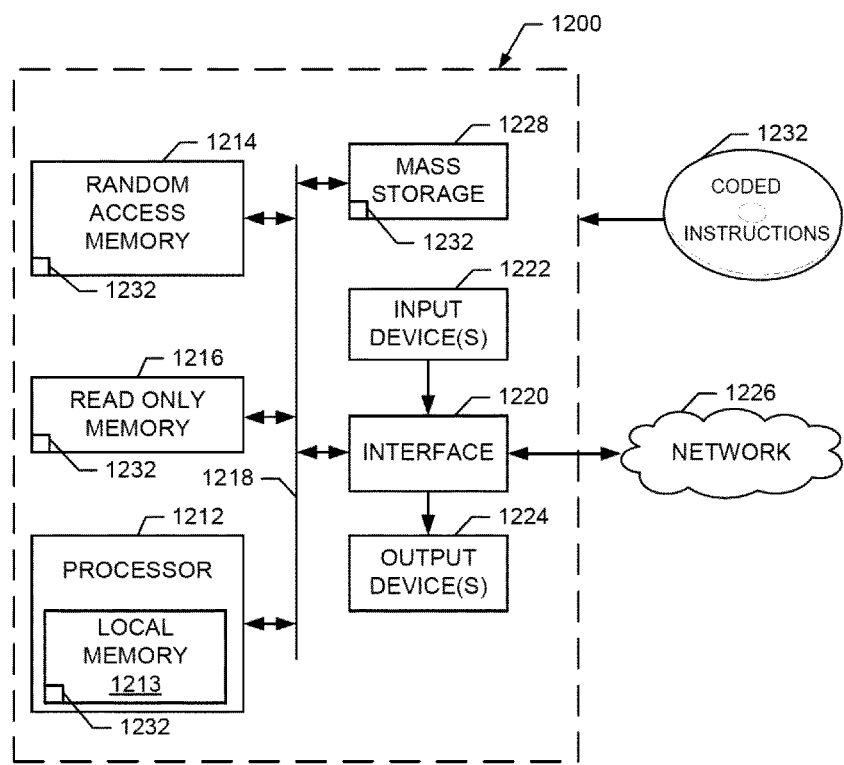
FIG. 12 is a block diagram of an example processing platform capable of executing the example machine readable instructions of FIGS. 10 and 11 to implement the example profile promotion handler FIG. 1.

FIG. 12 is a block diagram of an example processor platform 1200 capable of executing the instructions of FIGS. 10 and 11 to implement the profile promotion handler 124 of FIG. 1. The processor platform 1200 can be, for example a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 10 and 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture update application deployments in cloud computing environments, while enabling administrators of the cloud computing environments an opportunity to reject the update. Disclosed examples update deployed applications within a deployment environment. An update may additionally be promoted to other deployment environments. Accordingly, examples disclosed herein facilitate updating large numbers of application deployments within a cloud computing environment in an efficient and synchronized manner.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to update an application across a plurality of deployment environments, the method comprising:

after distribution of a master update profile to update a component of the application by a central profile promoter to all deployment environments, allowing a first one of the deployment environments to apply a first modified version of the master update profile different from a second modified version of the master update profile applied by a second one of the deployment environments by:

creating a copy of the master update profile at the first deployment environment;

modifying the copy of the master update profile at the first deployment environment to create the first modified version of the master update profile;

in response to a notification of promotion of the first modified version of the master update profile at the first deployment environment, displaying a user-selectable control in a user interface, selection of the user-selectable control to specify whether to apply the first modified version of the master update profile to the component of the application deployed in the first deployment environment;

after selection of the user-selectable control instructions application of the first modified version, performing a compatibility check of the first deployment environment and the first modified version of the master update profile; and based on an outcome of the compatibility check, applying the first modified version of the master update profile to the component of the application deployed in the first deployment environment.

2. A method as defined in claim 1, wherein the user-selectable control is a first user-selectable control, the user interface is a first user interface, and the method further includes displaying a second user-selectable control in a second user interface, the second user-selectable control to specify whether to modify the master update profile at the first deployment environment.

3. A method as defined in claim 1, further including:
obtaining a notification of promotion of the master update profile at the second deployment environment of the plurality of deployment environments; and
determining whether to apply the master update profile in the second deployment environment independent of the selection of the user-selectable control at the first deployment environment.

4. A method as defined in claim 1, wherein the user-selectable control is a first user-selectable control, the user interface is a first user interface, and the method further includes:
displaying a second user-selectable control in a second user interface at the second deployment environment, selection of the second user-selectable control to specify that the second modified version of the master update profile is to be promoted across others of the plurality of deployment environments; and
notifying, from the second deployment environment, the others of the plurality of the deployment environments in which the second modified version of the master update profile is to be promoted.

5. A method as defined in claim 4, further including:
creating the second modified version of the master update profile by modifying the copy of the master update profile at the second deployment environment; and
in response to selection of the second user-selectable control at the second deployment environment, providing the second modified version of the master update profile to a third deployment environment.

6. A method as defined in claim 4, further including creating a record identifying which deployment environments of the plurality of deployment environments applied respective versions of the master update profile.

7. An apparatus to update an application deployed across a plurality of deployment environments, the apparatus comprising:
a memory including machine readable instructions; and
a processor to execute the instructions to at least:
after distribution of a master update profile to all deployment environments to update a component of the application, allow a first one of the deployment environments to apply a first modified version of the master update profile different from a second modified version of the master update profile applied by a second one of the deployment environments by:
creating a copy of the master update profile at the first deployment environment;
modifying the copy of the master update profile at the first deployment environment to create the first modified version of the master update profile;
in response to a notification of promotion of the first modified version of the master update profile received at the first deployment environment, displaying a user-selectable control in a user interface, selection of the user-selectable control to specify whether to apply the first modified version of the master update profile to the component of the application deployed in the first deployment environment;
after selection of the user-selectable control instructing application of the first modified version, performing a compatibility check of the first deployment environment and the first modified version of the master update profile; and
based on an outcome of the compatibility check, applying the first modified version of the master update profile to the component of the application deployed in the first deployment environment.

8. An apparatus as defined in claim 7, wherein the user-selectable control is a first user-selectable control, the user interface is a first user interface, and the instructions further cause the processor to display a second user-selectable control in a second user interface, the second user-selectable control to specify whether to modify the master update profile at the first deployment environment.

9. An apparatus as defined in claim 7, wherein the instructions further cause the processor to:
obtain a notification of promotion of the master update profile at the second deployment environment of the plurality of deployment environments; and
determine whether to apply the master update profile in the second deployment environment independent of the selection of the user-selectable control at the first deployment environment.

10. An apparatus as defined in claim 7, wherein the user-selectable control is a first user-selectable control, the user interface is a first user interface, and the instructions further cause the processor to:
display a second user-selectable control in a second user interface at the second deployment environment, selection of the second user-selectable control to specify that the second modified version of the master update profile is to be promoted across others of the plurality of deployment environments; and
notify, from the second deployment environment, the others of the plurality of the deployment environments in which the second modified version of the master update profile is to be promoted.

11. An apparatus as defined in claim 10, wherein the instructions further cause the processor to:
create the second modified version of the master update profile by modifying the copy of the master update profile at the second deployment environment; and
in response to selection of the second user-selectable control at the second deployment environment, provide the second modified version of the master update profile to a third deployment environment.

12. An apparatus as defined in claim 10, wherein the instructions further cause the processor to create a record identifying which deployment environments of the plurality of deployment environments applied respective versions of the master update profile.

13. A tangible computer readable storage medium comprising instructions that, when executed, cause a processor to at least:
after distribution of a master update profile to all deployment environments to update a component of an application, allow a first one of the deployment environments to apply a first modified version of the master update profile different from a second modified version of the master update profile applied by a second one of the deployment environments by:
  creating a copy of the master update profile at the first deployment environment;
  modifying the copy of the master update profile at the first deployment environment to create the first modified version of the master update profile;
  in response to a notification of promotion of the first modified version of the master update profile at the first deployment environment, displaying a user-selectable control in a user interface, selection of the user-selectable control to specify whether to apply the first modified version of the master update profile to the component of the application deployed in the first deployment environment;
  after selection of the user-selectable control instructing application of the first modified version, performing a compatibility check of the first deployment environments and the first modified version of the master update profile; and
  based on an outcome of the compatibility check, applying the first modified version of the master update profile to the component of the application deployed in the first deployment environment.

14. A tangible computer readable storage medium as defined in claim 13, wherein the user-selectable control is a first user-selectable control, the user interface is a first user interface, and the instructions further cause the processor to display a second user-selectable control in a second user interface, the second user-selectable control to specify whether to modify the master update profile at the first deployment environment.

15. A tangible computer readable storage medium as defined in claim 13, wherein the instructions further cause the processor to:
  obtain a notification of promotion of the master update profile at the second deployment environment of the plurality of deployment environments; and
  determine whether to apply the master update profile in the second deployment environment independent of the selection of the user-selectable control at the first deployment environment.

16. A tangible computer readable storage medium as defined in claim 13, wherein the user-selectable control is a first user-selectable control, the user interface is a first user interface, and the instructions further cause the processor to:
  display a second user-selectable control in a second user interface at the second deployment environment, selection of the second user-selectable control to specify that the second modified version of the master update profile is to be promoted across others of the plurality of deployment environments; and
  notify, from the second deployment environment, the others of the plurality of the deployment environments in which the second modified version of the master update profile is to be promoted.

17. A tangible computer readable storage medium as defined in claim 16, wherein the instructions further cause the processor to:
  create the second modified version of the master update profile by modifying the copy of the master update profile at the second deployment environment; and
  in response to selection of the second user-selectable control at the second deployment environment, provide the second modified version of the master update profile to a third deployment environment.

18. A tangible computer readable storage medium as defined in claim 16, wherein the instructions further cause the processor to create a record identifying which deployment environments of the plurality of deployment environments applied respective versions of the master update profile.

* * * * *